(12) United States Patent
Wang

(10) Patent No.: US 8,159,227 B2
(45) Date of Patent: Apr. 17, 2012

(54) METHODS FOR MAKING DIRECTIONAL RESISTIVITY MEASUREMENTS

(75) Inventor: Tsili Wang, Katy, TX (US)

(73) Assignee: Smith International Inc., Houston, TX (US)

( * ) Notice: Subject to any disclaimer, the term of this patent is extended or adjusted under 35 U.S.C. 154(b) by 331 days.

(21) Appl. No.: 12/463,490

(22) Filed: May 11, 2009

(65) Prior Publication Data

US 2010/0283469 A1 Nov. 11, 2010

(51) Int. Cl.
*G01V 3/00* (2006.01)
*G01V 3/10* (2006.01)

(52) U.S. Cl. ........................................ 324/338; 324/339
(58) Field of Classification Search .................. None
See application file for complete search history.

(56) References Cited

U.S. PATENT DOCUMENTS

| | | |
|---|---|---|
| 5,045,795 A | 9/1991 | Gianzero et al. |
| 5,168,234 A * | 12/1992 | Freedman ................... 324/338 |
| 5,200,705 A * | 4/1993 | Clark et al. ................. 324/338 |
| 6,181,138 B1 | 1/2001 | Hagiwara et al. |
| 6,297,639 B1 | 10/2001 | Clark et al. |
| 6,476,609 B1 | 11/2002 | Bittar |
| 6,509,738 B1 | 1/2003 | Minerbo et al. |
| 6,556,015 B1 | 4/2003 | Omeragic et al. |
| 6,566,881 B2 | 5/2003 | Omeragic et al. |
| 6,573,722 B2 | 6/2003 | Rosthal et al. |
| 6,819,110 B2 | 11/2004 | Omeragic et al. |
| 6,836,218 B2 | 12/2004 | Frey et al. |
| 6,903,553 B2 | 6/2005 | Itskovich et al. |
| 6,911,824 B2 | 6/2005 | Bittar |
| 6,937,022 B2 | 8/2005 | Itskovich et al. |
| 6,969,994 B2 | 11/2005 | Minerbo et al. |
| 6,998,844 B2 | 2/2006 | Omeragic et al. |
| 7,003,401 B2 | 2/2006 | Haugland |
| 7,019,528 B2 | 3/2006 | Bittar |
| 7,038,457 B2 | 5/2006 | Chen et al. |
| 7,046,009 B2 * | 5/2006 | Itskovich ..................... 324/338 |
| 7,057,392 B2 | 6/2006 | Wang et al. |
| 7,091,877 B2 * | 8/2006 | Barber et al. .............. 340/853.1 |
| 7,138,803 B2 | 11/2006 | Bittar |
| 7,202,670 B2 | 4/2007 | Omeragic et al. |
| 7,265,552 B2 | 9/2007 | Bittar |
| 7,269,515 B2 | 9/2007 | Tabarovsky et al. |
| 7,274,991 B2 | 9/2007 | Tabarovsky et al. |
| 7,286,091 B2 | 10/2007 | Chen et al. |
| 7,345,487 B2 | 3/2008 | Bittar et al. |
| 7,353,613 B2 | 4/2008 | Bartel et al. |
| 7,382,135 B2 | 6/2008 | Li et al. |

(Continued)

OTHER PUBLICATIONS

International Search Report and Written Opinion dated Dec. 31, 2010 for corresponding PCT application No. PCT/US2010/034284 filed May 11, 2010.

(Continued)

*Primary Examiner* — Paresh Patel
(74) *Attorney, Agent, or Firm* — Darla Fonseca; Bridgitte Echols; Charlotte Rutherford

(57) ABSTRACT

One exemplary embodiment of a method for making directional resistivity measurements includes transmitting an axial electromagnetic wave in a borehole and receiving substantially pure axial and transverse components of the wave. A ratio of the axial and transverse components is computed and may be utilized as an indicator of various formation parameters. The invention advantageously enables the moment of the transmitting antenna to be canceled and therefore can result in improved accuracy.

14 Claims, 4 Drawing Sheets

U.S. PATENT DOCUMENTS

| | | |
|---|---|---|
| 7,385,400 B2 | 6/2008 | Moore |
| 7,414,407 B2 | 8/2008 | Wang et al. |
| 7,436,184 B2 | 10/2008 | Moore |
| 7,463,035 B2 | 12/2008 | Merchant et al. |
| 7,471,088 B2 | 12/2008 | Yu et al. |
| 2006/0186888 A1* | 8/2006 | Wang et al. .......... 324/338 |
| 2007/0257677 A1 | 11/2007 | Wang |
| 2008/0068022 A1 | 3/2008 | Peter et al. |
| 2008/0074336 A1 | 3/2008 | Signorelli et al. |
| 2008/0078580 A1 | 4/2008 | Bittar |
| 2008/0158082 A1 | 7/2008 | Wang et al. |
| 2008/0246486 A1 | 10/2008 | Forgang et al. |
| 2008/0290873 A1 | 11/2008 | Homan et al. |
| 2009/0015261 A1 | 1/2009 | Yang et al. |

OTHER PUBLICATIONS

Fang, S., et al.; "Determination of structural dip and azimuth from LWD azimuthal propagation resistivity measurements in anisotropic formations". 2008 SPE Annual Technical Conference and Exhibition, Denver, CO, Sep. 21-24, 2008.

Li, Q., et al.; "New directional electromagnetic tool for proactive geosteering and accurate formation evaluation while drilling". SPWLA 46th Annual Logging Symposium, Jun. 26-29, 2005, pp. 1-16.

* cited by examiner

METHODS FOR MAKING DIRECTIONAL RESISTIVITY MEASUREMENTS

RELATED APPLICATIONS

None.

FIELD OF THE INVENTION

The present invention relates generally to methods for making directional resistivity measurements of the electromagnetic properties of a subterranean borehole. More particularly, method embodiments of this invention include computing a ratio of axial and transverse components of a received electromagnetic wave.

BACKGROUND OF THE INVENTION

The use of electrical measurements in prior art downhole applications, such as logging while drilling (LWD), measurement while drilling (MWD), and wireline logging applications is well known. Such techniques may be utilized to determine a subterranean formation resistivity, which, along with formation porosity measurements, is often used to indicate the presence of hydrocarbons in the formation. For example, it is known in the art that porous formations having high electrical resistivity often contain hydrocarbons, such as crude oil, while porous formations having low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Directional resistivity measurements are also commonly utilized to provide information about remote geological features (e.g., remote beds, bed boundaries, and/or fluid contacts) not intercepted by the measurement tool. Such information includes, for example, the distance from and direction to the remote feature. In geosteering applications, directional resistivity measurements may be utilized in making steering decisions for subsequent drilling of the borehole. For example, an essentially horizontal section of a borehole may be routed through a thin oil bearing layer. Due to the dips and faults that may occur in the various layers that make up the strata, the distance between a bed boundary and the drill bit may be subject to change during drilling. Real-time distance and direction measurements may enable the operator to adjust the drilling course so as to maintain the bit at some predetermined distance from the boundary layer. Directional resistivity measurements also enable valuable geological information to be estimated, for example, including the dip and strike angles of the boundary as well as the vertical and horizontal conductivities of the formation.

Methods are known in the art for making LWD directional resistivity measurements. For example, LWD directional resistivity tools commonly measure or estimate a cross-component (e.g., the $H_{zx}$ component) of an electromagnetic wave as the tool rotates in the borehole (e.g., during drilling). Various tool configurations are known in the art for measuring such cross-components. For example, U.S. Pat. No. 6,181,138 to Hagiwara teaches a method that employs an axial transmitting antenna and three co-located, circumferentially offset tilted receiving antennae. U.S. Pat. No. 6,969,994 to Minerbo et al., U.S. Pat. No. 7,202,670 to Omeragic et al., and U.S. Pat. No. 7,382,135 to Li et al teach a method that employs an axial transmitting antenna and two axially spaced tilted receiving antennae. The receiving antennae are further circumferentially offset from one another by an angle of 180 degrees. U.S. Pat. Nos. 6,476,609, 6,911,824, 7,019,528, 7,138,803, and 7,265,552 to Bittar teach a method that employs an axial transmitting antenna and two axially spaced tilted receiving antennae in which the tilted antennae are tilted in the same direction. While tilted antennae have been utilized commercially, one drawback with their use is that they transmit and/or receive mixed mode electromagnetic waves which do not allow small (e.g., transversal) signals to be easily separated out in the presence of measurement noises.

U.S. Pat. Nos. 7,057,392 and 7,414,407 to Wang et al teach a method that employs an axial transmitting antenna and two longitudinally spaced transverse receiving antennae. When the transmitter is fired each receiver measures the $H_{zx}$ cross-component. These cross-components are then averaged (combined additively) to suppress tool bending effects. In order to make reliable measurements, the transmitter and/or receiver gain must remain constant, which can be problematic as the borehole temperature and pressure commonly fluctuate in downhole operations. Moreover, variations in the transmitter and/or receiver gain from tool to tool can erode the accuracy and consistency of the measurements.

While the above described methods (and the associated LWD resistivity tools) have been used commercially, there remains a need for further improved methods for making LWD directional resistivity measurements.

SUMMARY OF THE INVENTION

Aspects of the present invention are intended to address the above described need for improved methods for making directional resistivity measurements. In one exemplary embodiment, the invention includes transmitting an axial electromagnetic wave in a borehole and receiving substantially pure axial and transverse components of the wave. The axial and transverse components are preferably received using first and second collocated receiving antennae, e.g., collocated non-planar antennae. A ratio of the axial and transverse components is computed and may be utilized as an indicator of various formation parameters.

Exemplary embodiments of the present invention may advantageously provide several technical advantages. For example, by computing a ratio of the transverse and axial components of the received electromagnetic wave, exemplary embodiments of the invention advantageously enable the moment of the transmitting antenna to be canceled. The computed ratio therefore tends to be advantageously independent of and insensitive to the transmitter output or variations in the transmitter output. This can result in a significant improvement in tool reliability and accuracy. In other exemplary embodiments, the invention advantageously enables the moment of the receiving antenna to be canceled, which can also result in an improvement in tool reliability and accuracy.

In certain advantageous embodiments of the invention, the azimuthal sensitivity of the computed ratio is derived solely from the received cross-component $V_{zx}$ (or $H_{zx}$). In such embodiments the computed ratio may be advantageously directly proportional to the cross-component. The invention is further advantageous over the prior art in that it requires minimal downhole processing and is therefore well suited for use with downhole microcontrollers having limited processing power.

Moreover, in certain embodiments of the invention, a ratio of the axial and transverse components allows the near-bed anisotropy effect to be cancelled from two asymmetric transmitters without explicitly involving the antenna spacing in the calculation. This feature of the invention advantageously provides for a reduction in error since downhole temperature and pressure conditions can cause tool body deformation and therefore uncertainty in the precise antenna spacing.

In one aspect the present invention includes a method of making a directional resistivity measurement in a subterranean borehole. The method includes rotating a directional resistivity tool in a borehole. The tool includes at least one transmitting antenna configured to transmit a substantially pure z-mode electromagnetic wave and at least first and second receiving antennae longitudinally spaced from the transmitting antenna. The first receiving antenna is configured to receive a substantially pure z-mode component of an electromagnetic wave, and the second receiving antenna is configured to receive a substantially pure x-mode component of an electromagnetic wave. The transmitting antenna transmits an electromagnetic wave into the borehole. Substantially pure z-mode and x-mode components of the electromagnetic wave are received by the first and second receiving antennae and a ratio of the received z-mode and x-mode components is then computed.

In another aspect, the invention includes a directional resistivity tool. A logging while drilling tool body includes at least one transmitting antenna deployed thereon, the transmitting antenna configured to transmit substantially pure z-mode electromagnetic waves. At least first and second receiving antennae are longitudinally spaced from the transmitting antennae and configured to receive corresponding substantially pure z-mode and x-mode components of an electromagnetic wave. A controller is configured to cause the transmitting antenna to transmit an electromagnetic wave, cause the first and second receiving antennae to receive substantially pure z-mode and x-mode components of the wave, and compute a ratio of the received z-mode and x-mode components.

In still another aspect, the present invention includes a method of making a directional resistivity measurement in a subterranean borehole. The method includes rotating a directional resistivity tool in a borehole. The tool includes at least first and second transmitting antennae and at least one receiving antenna configured to receive a substantially pure z-mode component of an electromagnetic wave. The first transmitting antenna is configured to transmit a substantially pure z-mode electromagnetic wave, and the second transmitting antenna is configured to transmit a substantially pure x-mode electromagnetic wave. The first transmitting antenna transmits a first electromagnetic wave, a substantially pure z-mode component of which is received by the receiving antenna. The second transmitting antenna transmits a second electromagnetic wave, a substantially pure z-mode component of which is also received by the receiving antenna. A ratio of the z-mode components received from the first and second electromagnetic waves is then computed.

In yet another aspect, the invention includes a directional resistivity tool. The tool includes a logging while drilling tool body having at least first and second transmitting antennae deployed on the tool body, the antennae being configured to transmit corresponding substantially pure z-mode and x-mode electromagnetic waves. At least one receiving antennae is longitudinally spaced from the transmitting antennae and configured to receive a substantially pure z-mode component of an electromagnetic wave. A controller is configured to cause the transmitting antenna to sequentially transmit corresponding first and second z-mode and x-mode electromagnetic waves, cause the receiving antenna to receive substantially pure z-mode components of each of the first and second electromagnetic waves, and compute a ratio of the received z-mode components.

In a further aspect, the present invention includes a method of making a directional resistivity measurement in a subterranean borehole. The method includes rotating a directional resistivity tool in a borehole. The tool includes first and second collocated receiving antennae deployed axially between first and second transmitting antennae. The first receiving antenna is configured to receive a substantially pure z-mode component of an electromagnetic wave, and the second receiving antenna is configured to receive a substantially pure x-mode component of an electromagnetic wave. The first and second transmitting antennae are asymmetrically spaced about the receiving antennae such that $L_1 \neq L_2$, wherein $L_1$ and $L_2$ represent axial distances between the receiving antennae and the corresponding first and second transmitting antennae; The first transmitting antenna transmits a first electromagnetic wave at a corresponding first frequency $f_1$, substantially pure z-mode and x-mode components of which are received by the first and second receiving antennae. A first ratio of these z-mode and x-mode components is computed. The second transmitting antenna transmits a second electromagnetic wave at a corresponding second frequency $f_2$ such that $f_1/f_2 = L_2^2/L_2^2$. Substantially pure z-mode and x-mode components of the second electromagnetic wave are received by the first and second receiving antennae. A second ratio of these z-mode and x-mode components is computed.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
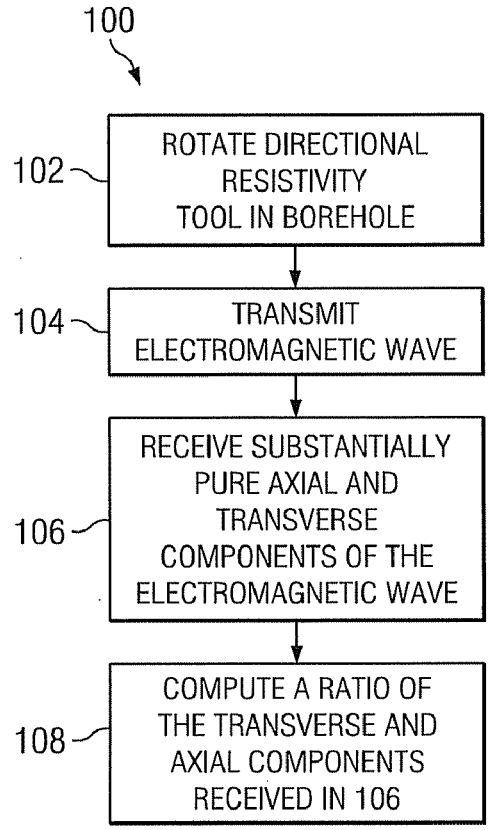
FIGS. 1A and 1B depict exemplary method embodiments in accordance with the present invention in flow chart form.
Figure 1B:
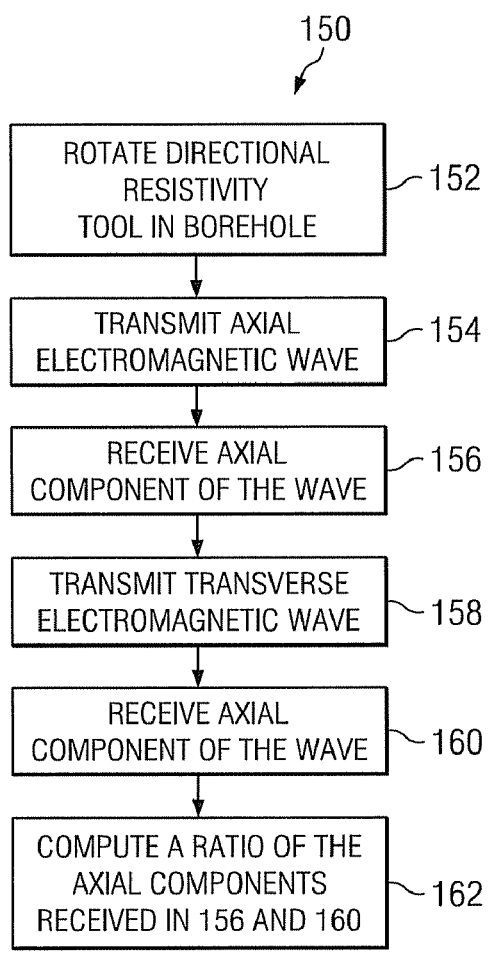

With reference to FIGS. 1A and 1B (collectively FIG. 1), exemplary method embodiments 100 and 150 in accordance with the present invention are depicted in flowchart form. In the exemplary method embodiment 100 depicted on FIG. 1A, a directional resistivity tool is rotated in a borehole at 102. As described in more detail below, the resistivity tool includes at least one substantially pure mode transmitting antenna (preferably an axial transmitting antenna), at least one substantially pure axial mode receiving antenna, and at least one substantially pure transverse mode receiving antenna. The transmitting antenna may be fired (energized) at 104 thereby transmitting a substantially pure mode electromagnetic wave into the subterranean formation. Substantially pure axial and transverse components of the electromagnetic wave may be received at 106 via the corresponding receiving antennae. A ratio of the components of the electromagnetic wave received in 106 may then be calculated at 108. The ratio is preferably computed downhole and the result stored in downhole memory and/or telemetered to the surface.

It will be appreciated that method embodiments in accordance with the present invention make use of electromagnetic (EM) directional resistivity tools having substantially pure mode transmitting and receiving antennae. Such pure mode antennae are defined with respect to the reference frame of the directional resistivity tool (or the borehole) in which one axis (typically the z-axis) is coincident with the longitudinal axis of the tool (or borehole). In this reference frame, an "axial antenna" is one in which the magnetic moment of the antenna is coincident with the tool axis. An axial antenna transmits and/or receives substantially pure axial mode (z-mode) electromagnetic waves. A "transverse antenna" is one in which the magnetic moment of the antenna is orthogonal to the tool axis. A transverse antenna transmits and/or receives substantially pure transverse mode (x-mode or y-mode) electromagnetic waves.

The antennae utilized in accordance with the present invention are configured to transmit and/or receive substantially pure mode electromagnetic waves. For example, an axial transmitting antenna transmits substantial pure z-mode electromagnetic waves when energized. A transverse receiving antenna receives a substantially pure x-mode (or y-mode) component of an electromagnetic wave. By substantially pure it is meant that the transmitting and receiving antennae are intended to transmit and/or receive pure mode electromagnetic waves. For example, a conventional axial transmitting antenna is intended to transmit pure z-mode electromagnetic waves and may therefore be said to produce substantially pure z-mode electromagnetic waves. Likewise, a conventional transverse receiving antenna is intended to receive a pure x-mode component of an electromagnetic wave and may therefore be said to receive a substantially pure x-mode component of an electromagnetic wave. This is in contrast to an antenna that is intended to transmit and/or receive a mixed mode electromagnetic wave. For example, a conventional tilted antenna is intended to transmit and/or receive a mixed mode electromagnetic wave (e.g., mixed x- and z-modes) and may therefore not be said to transmit and/or receive a substantially pure electromagnetic wave.

It will be understood by those of ordinary skill in the art that conventional axial and transverse antennae typically transmit and/or receive impure modes, e.g., due to engineering constraints. The invention is not limited in these regards. Despite the presence of such impurities (which may be, for example, on the order of a few percent), a conventional axial antenna may still be said to transmit and/or receive substantially pure z-mode electromagnetic waves. Likewise, a conventional transverse antenna may still be said to transmit and/or receive substantially pure x-mode (or y-mode) electromagnetic waves.

Figure 2A:
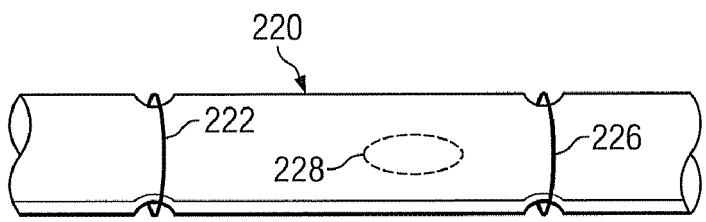
FIGS. 2A and 2B depict exemplary directional resistivity tool embodiments suitable for use with exemplary method embodiments of the present invention.
Figure 2B:
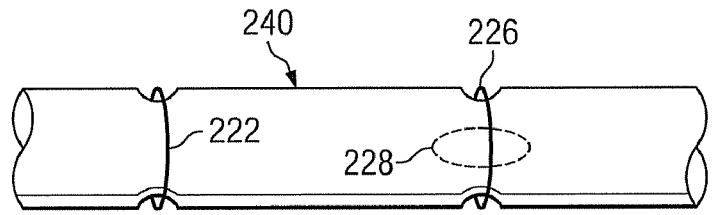

FIGS. 2A and 2B (collectively FIG. 2) depict exemplary EM directional resistivity tools 220 and 240 suitable for use with certain method embodiments in accordance with the present invention. Resistivity tool 220 (FIG. 2A) includes at least one axial transmitting antenna 222 deployed about the tool body. The tool 220 further includes at least one axial receiving antenna 226 and at least one transverse receiving antenna 228. In the exemplary embodiment depicted on FIG. 2A, the receiving antennae 226 and 228 are longitudinally spaced on the tool body. These receiving antennae may also be collocated, for example, as depicted on FIG. 2B for tool embodiment 240. It will be appreciated that suitable tool embodiments may further include multiple spaced and/or collocated transmitting and receiving antennae. The invention is not limited in these regards. Suitable tool embodiments may also include one or more y-mode transmitting and/or receiving antennae longitudinally spaced from or collocated with the other transmitting and receiving antennae.

As is well understood in the art, under the principle of reciprocity, each of the transmitting and receiving antennae may operate as either a transmitter or a receiver when coupled with the appropriate transmitter and/or receiver electronics. Therefore, suitable tool embodiment 220 (FIG. 2A) may alternatively be configured such that antennae 226 and 228 are configured as transmitting antennae and such that antenna 222 is configured as a receiving antenna. In such an embodiment, the transmitting antennae 226 and 228 may also be collocated, for example, as depicted on FIG. 2B for tool embodiment 240.

It will further be understood that methods in accordance with the invention may make use of either EM induction or propagation measurements. In general, EM propagation tools operate in a similar fashion, but typically at higher frequencies than EM induction tools. The invention is not limited by the frequency of the electromagnetic waves. Those of ordinary skill in the art will also recognize that electromagnetic waves having multiple (2 or more) frequency components may be employed. The invention is in no way limited in these regards.

As is known to those of ordinary skill in the art, a time varying electric current (an alternating current) in a transmitting antenna (e.g., transmitting antenna 222) produces a corresponding time varying magnetic field in the formation. The magnetic field in turn induces electrical currents (eddy currents) in the conductive formation. These eddy currents further produce secondary magnetic fields which may produce a voltage response in a receiving antenna (e.g., in receiving antennae 226 and 228). The measured voltage in the receiving antennae can be processed, as is known to those of ordinary skill in the art, to obtain one or more measurements of the secondary magnetic field, which may in turn be further processed to estimate formation resistivity (conductivity) and/or dielectric constant. These electrical formation properties can be further related to the hydrocarbon bearing potential of the formation via techniques known to those of skill in the art.

With continued reference to FIGS. 1 and 2, the transmitting antenna preferably transmits a substantially pure z-mode electromagnetic wave at 104. The transmitted electromagnetic may then be received at 106 by the axial and transverse receiving antennae (e.g., antenna 226 and 228 on FIG. 2A). The ratio of the received components may advantageously be calculated at 108, for example, as follows:

$$r = \frac{V_{zx}}{V_{zz}} \qquad \text{Equation 1}$$

where r represents the ratio, $V_{zz}$ represents the voltage response received by the axial receiving antenna (e.g., antenna 226) and $V_{zx}$ represents the voltage response received by the transverse receiving antenna (e.g., antenna 228). It will be understood that within this system for naming the measured voltage responses (or magnetic field responses), the first index indicates the mode of the transmitter and the second index indicates the mode of the receiver.

Those of ordinary skill in the art will readily appreciate that $V_{zx}$ may be processed to obtain the $H_{zx}$ cross-component and that $V_{zz}$ may be processed to obtain the $H_{zz}$ component. Thus, the ratio in Equation 1 may alternatively (and equivalently) be expressed mathematically in terms of the magnetic field components as follows (the invention is not limited in these regards):

$$r = \frac{H_{zx}}{H_{zz}} \qquad \text{Equation 2}$$

The ratios computed in Equations 1 and/or 2 provide at least three distinct advantages. First, the Equations 1 and 2 are especially well suited for use with downhole microcontrollers having limited processing power. Equation 1, for example, advantageously includes only a single division function. The ratios computed in Equations 1 and 2 also advantageously enable the transmitter moment to be canceled (as shown in more detail below with respect to Equations 7, 8, and 9). As is known to those of ordinary skill in the art, the voltage measured at a receiving antenna tends to be directly proportional to the transmitter moment. As described above, transmitter gain commonly varies downhole (e.g., as the borehole temperature and/or pressure change), which can result in a varying transmitter moment (amplitude). Significant tool to tool variation is also sometimes observed. Computing the ratio r (when $V_{zx}$ and $V_{zz}$ are measured for the same transmitter firing) mathematically cancels the transmitter moment. The ratio r therefore tends to be independent of and therefore insensitive to the transmitter output or variations in the transmitter output.

The ratios computed in Equations 1 and 2 are further advantageous in that the azimuthal sensitivity of these ratios is derived solely from the measured cross-component $V_{zx}$ (or $H_{zx}$). The $V_{zz}$ (or $H_{zz}$) component is known to be insensitive to tool rotation (i.e., insensitive to azimuth angle) and thus the ratios expressed in Equations 1 and 2 are advantageously directly proportional to the cross-component. Since the $V_{zz}$ (or $H_{zz}$) component is known to be the only component that is insensitive to tool rotation, the present invention preferably utilizes an axial transmitting antenna (a substantially pure z-mode transmitter).

Figure 3A:
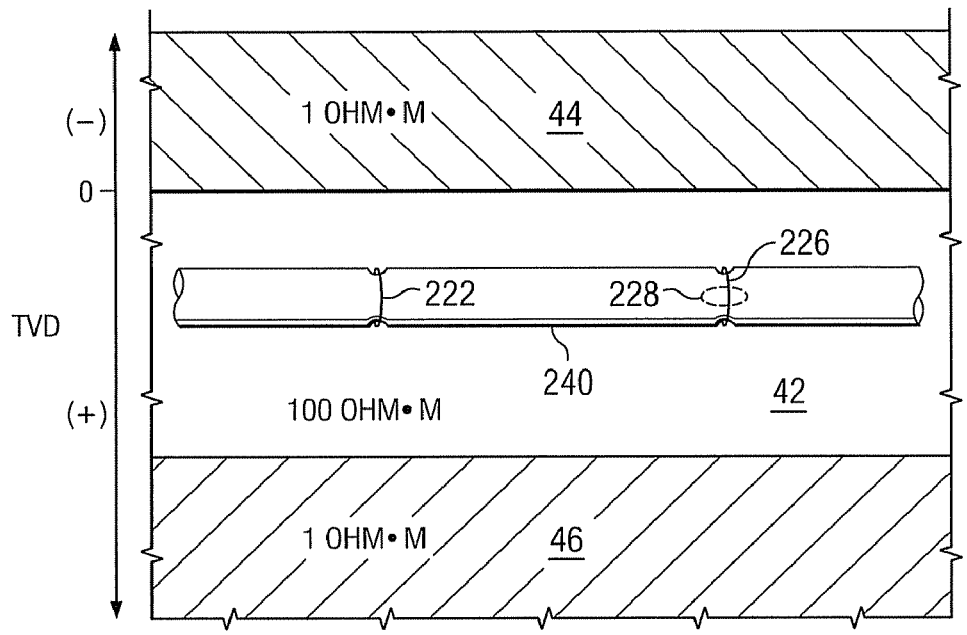
FIGS. 3A and 3B depict a hypothetical example in which one exemplary method embodiment in accordance with the present invention is evaluated.
Figure 3B:
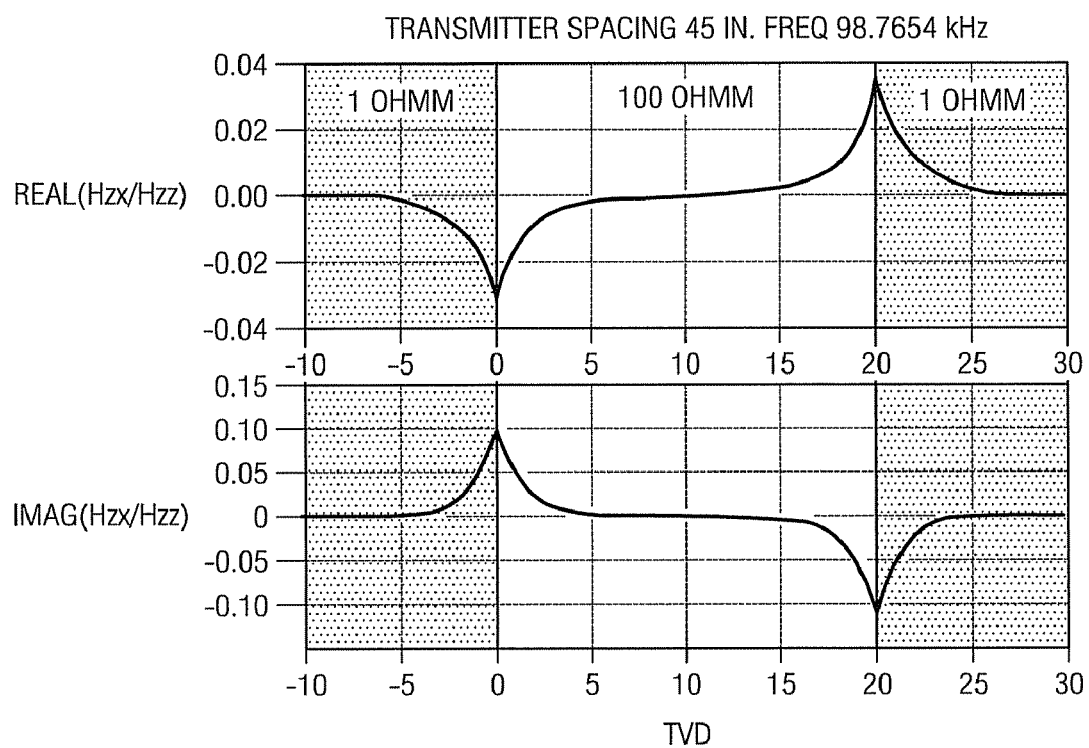

To further illustrate the azimuthal sensitivity of the ratio r, FIGS. 3A and 3B, depict a hypothetical example in which one exemplary embodiment of measurement tool 240 (also depicted on FIG. 2B) is deployed in a subterranean formation. In the exemplary embodiment depicted, the transmitting antenna 222 is configured to transmit electromagnetic radiation at a frequency of about 98 kHz and is spaced a distance of 45 inches from collocated receiving antennae 226 and 228. Measurement tool 240 is deployed in a near-bed 42 having a resistivity of 100 ohm·m. The near-bed lies between conductive layers (or beds) 44 and 46, each of which has a resistivity of 1 ohm·m. The boundary between the layers 42 and 44 is arbitrarily defined to be at zero total vertical depth (TVD). Thus, as shown, the measurement tool 240 has a positive vertical depth when located in the near-bed 42. The tool is further assumed to be at an 88 degree angle with respect to the bed boundaries.

FIG. 3B depicts a theoretical plot of the real and imaginary portions of the ratio r as a function of TVD for the hypothetical model depicted on FIG. 3A. As shown, both the real and imaginary portions of the ratio are highly sensitive to the bed boundary. Moreover, the direction of the boundary is indicated by the sign (positive or negative) of the ratio. In FIG. 3B, the upper boundary layer is indicated when the real portion of the ratio is positive and the imaginary portion is negative. The lower boundary is indicated when the real portion of the ratio is negative and the imaginary portion is positive.

While the voltage ratio given in Equation 1 is preferred, it will be appreciated that the invention is not limited in this regard. Other suitable ratios may be computed in accordance with the present invention. For example, in alternative embodiments, the ratio r may be expressed mathematically, for example, as follows:

$$r = \frac{V_{zz} + V_{zx}}{V_{zz}} = 1 + \frac{V_{zx}}{V_{zz}} \qquad \text{Equation 3}$$

where $V_{zx}$ and $V_{zz}$ are as defined above with respect to Equation 1. Still other suitable ratios may be expressed mathematically, for example, as follows:

$$r = \frac{n_1 V_{zz} + \sqrt{1 - n_1^2}\, V_{zx}}{n_2 V_{zz} + \sqrt{1 - n_2^2}\, V_{zx}} \qquad \text{Equation 4}$$

$$r = \frac{m_1 V_{zz} + m_2 V_{zx}}{m_3 V_{zz} + m_4 V_{zx}} \qquad \text{Equation 5}$$

wherein r represents the ratio, $V_{zx}$ and $V_{zz}$ are again as defined above with respect to Equation 1, $n_1$ and $n_2$ represent arbitrary real numbers such that $0 \leq n_1 \leq 1$, $0 \leq n_2 \leq 1$, and when the receiving antenna are collocated $n_1 \neq n_2$, and $m_1, m_2, m_3$, and $m_4$ represent arbitrary real numbers, and when the receiving antenna are collocated $m_1 \neq m_3$ and $m_2 \neq m_4$. In Equation 4, the voltage ratio r is defined from two virtual tilted receivers located at the same axial position. Each virtual tilted receiver response is computed from the response of the collocated axial receiving antenna and the transverse receiving antenna (i.e., from $V_{zz}$ and $V_{zx}$). In Equation 5, the voltage ratio r is defined as an arbitrary combination of the axial and transverse receiver responses. While the ratios given in Equations 4 and 5 may be suitable for certain operations (e.g., to mimic the response of a tool employing tilted antennae), they do require significantly increased downhole computation as compared with the ratio given in Equations 1.

With reference again to FIG. 1, it will be appreciated that the invention is not limited to the embodiments described above. FIG. 1B depicts an alternative method embodiment 150 in accordance with the present invention in which a directional resistivity tool is rotated in a borehole at 152. The resistivity tool includes at least one substantially pure axial mode transmitting antenna, at least one substantially pure transverse mode transmitting antenna, and at east one substantially pure mode receiving antenna (preferably an axial receiving antenna). The transmitting antennae are fired sequentially (in either order) at 154 and 158 so as to transmit substantially pure z-mode and x-mode electromagnetic waves into the formation. Corresponding axial components of the transmitted waves are received at 156 and 160 via the axial receiving antenna. A ratio of the component of the electromagnetic waves received in 156 and 160 may then be computed at 162. The ratio is preferably computed downhole and the result stored in downhole memory and/or telemetered to the surface.

With continued reference to FIG. 1B, the ratio of the received component at 156 and 160 may advantageously be calculated at 162, for example, as follows:

$$r = \frac{V_{xz}}{V_{zz}} \qquad \text{Equation 6}$$

where r represents the ratio, $V_{zz}$ represents the voltage response received from the axial transmission and $V_{xz}$ represents the voltage response received from the transverse transmission. It will be appreciated by those of ordinary skill in the art that the ratio r computed in Equation 6 is essentially equivalent to that computed in Equation 1 based on the principle of reciprocity. However, while the ratio computed in Equation 1 advantageously enables the transmitter moment to be canceled, the ratio computed in Equation 6 advantageously enables the receiver moment to be canceled.

Figure 4A:
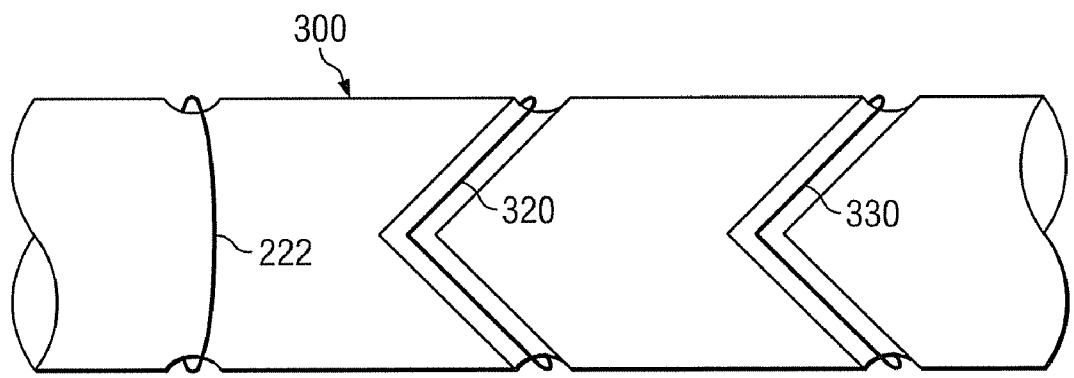
FIGS. 4A and 4B depict other exemplary directional resistivity tool embodiments suitable for use with exemplary method embodiments of the present invention.
Figure 4B:
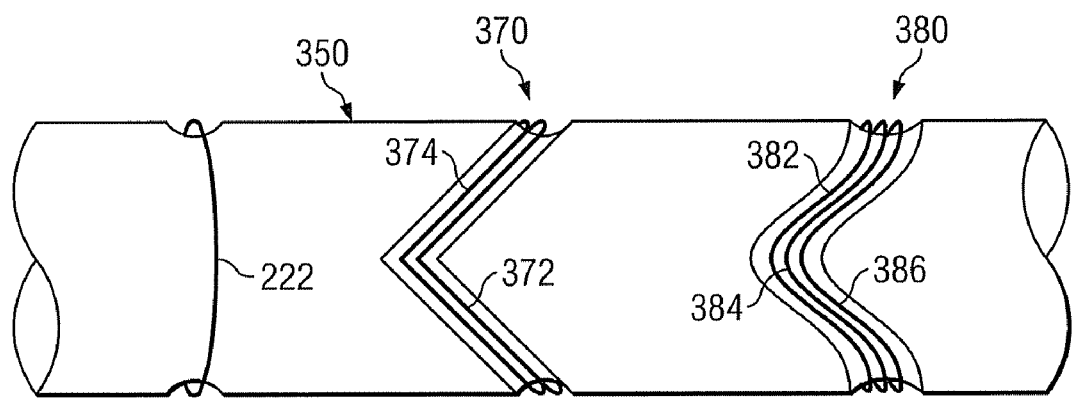

Turning now to FIGS. 4A and 4B (collectively FIG. 4), it will be appreciated that the present invention may advantageously utilize directional resistivity tool embodiments including one or more non-planar antennae. FIG. 4A depicts a measurement tool 300 including an axial transmitting antenna 222 and first and second non-planar receiving antennae 320 and 330 deployed about the tool body 310. In the exemplary embodiment depicted, receiving antenna 320 may be configured to receive a substantially pure x-mode component of an electromagnetic wave and antenna 330 may be configured to receive a substantially pure z-mode component of an electromagnetic wave. FIG. 4B depicts a measurement tool 350 including an axial transmitting antenna 220 and first and second receivers 370 and 380. Receiver 370 includes first and second collocated non-planar receiving antennae 372 and 374. In the exemplary embodiment depicted antenna 372 may be configured to receive a substantially pure z-mode component of an electromagnetic wave and antenna 374 may be configured to receive a substantially pure x-mode component of an electromagnetic wave. Receiver 380 includes first, second, and third collocated non-planar receiving antennae 382, 384, and 386. In the exemplary embodiment depicted antenna 382 may be configured to receive a substantially pure z-mode component of an electromagnetic wave, antenna 384 may be configured to received a substantially pure x-mode component of an electromagnetic wave, and antenna 386 may be configured to receive a substantially pure y-mode component of an electromagnetic wave. Measurement tools 300 and 350 may further include a non-planar transmitting antenna in place of the axial transmitting antenna 222. The invention is not limited in this regard. Such non-planar antennae are disclosed in commonly invented, commonly assigned, and co-pending U.S. patent application Ser. No. 12/409,655 (now U.S. Patent Publication 2010/0244841), which is fully incorporated by reference herein.

The non-planar antennae embodiments depicted on FIG. 4 are non-planar in that the loop (or loops) of antenna wire does not reside in a single geometric plane (i.e., in a two-dimensional plane). Thought of another way, the non-planar antennae depicted on FIG. 4 cannot be projected onto a straight line from any angle (hence these antennae may also be thought of and referred to as being non-linear antennae).

Exemplary antennae embodiments 320, 330, 372, and 374 depicted on FIGS. 4A and 4B may be thought of as being bi-planar in that distinct portions of each antenna reside on corresponding distinct first and second planes. Each of these non-planar antennae includes first and second semi-elliptical (or semi-oval) sections, each of which resides on a corresponding distinct geometric plane. These planes are preferably orthogonal to one another (e.g., being oriented at angles of 45 and −45 degrees with respect to the tool axis), although the invention is not limited in this regard. Projection of these non-planar antennae onto a longitudinal plane forms first and second non-parallel (and non-coincident) line segments. The bi-planar antennae may therefore also be thought of as being bi-linear. Bi-planar antennae embodiments tend to be preferred for tool embodiments in which the receiving antennae are configured to receive an axial component of an electromagnetic wave and a single transverse component (x-mode) of an electromagnetic wave. Such bi-planar antenna may therefore be advantageously utilized for certain method embodiments in accordance with the present invention.

Exemplary antennae embodiments 382, 384, and 386 depicted on FIG. 4B may be thought of as being sinusoidal in that the axial separation between the non-planar loop of antenna wire and a circular centerline of the antennae varies substantially sinusoidally with respect to the azimuth angle about the circumference of the tool. This feature of antennae embodiments 382, 384, and 386 is described in more detail in the '655 patent application. Sinusoidal antennae embodiments tend to be preferred for tool embodiments in which the receiving antennae are configured to receive an axial component (z-mode) of an electromagnetic wave and both transverse components (x-mode and y-mode) of an electromagnetic wave. Such sinusoidal antenna may also be advantageously utilized for certain method embodiments in accordance with the present invention. For example, in certain embodiments, the invention may further include computing a second ratio such as: $r_2 = V_{zy}/V_{zz}$.

With continued reference to FIG. 4, receiving antennae 330, 374 and 386 may be configured to receive a substantially pure z-mode component of an electromagnetic wave. This may be accomplished, for example (as is also described in more detail in the '655 patent application), by connecting the receiver electronics in series with the loop (or loops) of antenna wire. Receiving antennae 320, 372 and 382 may be configured to receive a substantially pure x-mode component of an electromagnetic wave. This may be accomplished, for example, by electrically connecting a first pair of circumferentially opposing points of the antenna wire to the receiver electronics. Receiving antenna 384 may be configured to receive a substantially pure y-mode component of an electromagnetic wave. This may be accomplished, for example, by electrically connecting a second pair of circumferentially opposing points of the antenna wire to the transceiver electronics, wherein the second pair of points is offset azimuthally from the first pair of points by about 90 degrees.

The use of non-planar receiving antennae advantageously simplifies the structure of a directional resistivity tool. For example, a collocated receiver (e.g., receivers 370 and 380) may be deployed in a single circumferential groove (recess) about the tool body. Moreover, there is no need to form slots or cuts in the tool body for the transverse modes. This feature is especially advantageous for LWD applications in that it tends to enable high tool strengths to be maintained.

Figure 5:
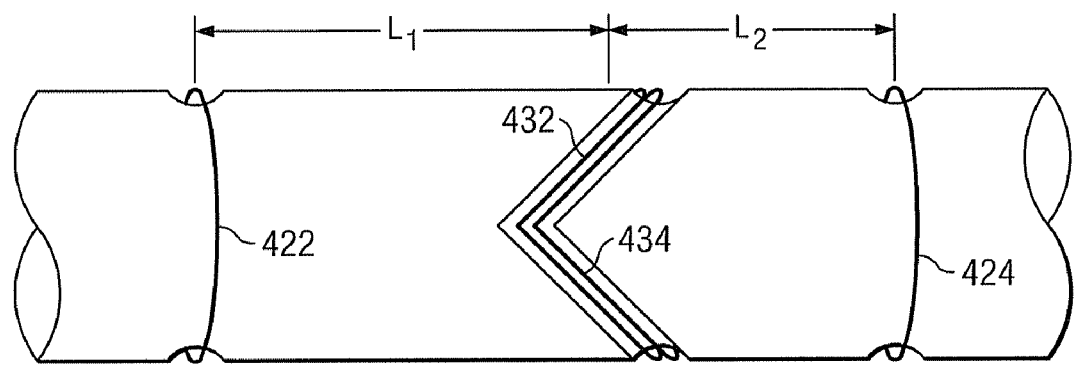
FIG. 5 depicts yet another exemplary directional resistivity tool embodiment suitable for use with exemplary method embodiments of the present invention.

Turning now to FIG. 5, another aspect of the present invention includes a method for reducing (or eliminating) the effect of near-bed anisotropy from directional resistivity measurements. FIG. 5 depicts a directional resistivity tool suitable for use with this aspect of the invention. In the exemplary tool embodiment depicted, a measurement tool 400 includes first and second axial transmitting antennae 422 and 424 deployed axially asymmetrically about a pair of collocated receiving antennae 432 and 434. Transmitting antenna 422 is axially spaced from the receiving antennae 432 and 434 by a distance $L_1$, while transmitting antenna 424 is axially spaced from the receiving antennae 432 and 434 by a distance $L_2$.

Transmitting antennae 422 and 424 are configured to transmit electromagnetic waves at mutually distinct frequencies. This may be accomplished, for example, by connecting the antennae to appropriate transmitter circuits. Suitable transmitter circuits may include, for example, an oscillator that provides a predetermined alternating current signal (having a predetermined frequency or frequencies) and thereby enable the antennae to transmit electromagnetic signals at one or more frequencies (e.g., in the range from about 0.05 to about 2 MHz). In particular, the first and second transmitters 422 and 424 are configured to transmit electromagnetic waves at corresponding first and second frequencies $f_1$ and $f_2$ such that: $f_1/f_2=L_2^2/L_1^2$, wherein $L_1$ and $L_2$ represent the axial distances between the first and second transmitting antennae 422 and 424 and the collocated receiving antennae 432 and 434.

In the exemplary embodiment depicted, the collocated receiving antennae are configured to receive substantially pure z-mode and x-mode components of an electromagnetic wave. For example, antenna 432 may be configured to receive substantially pure z-mode electromagnetic waves and antenna 434 may be configured to receive substantially pure x-mode electromagnetic waves. These collocated receiving antennae are similar to those depicted on FIG. 4B. It will be appreciated that this aspect of the invention is not limited to the use of non-planar antenna. Collocated axial and transverse receiving antennae (e.g., as depicted on FIG. 2B) may also be utilized.

It will further be appreciated that the invention is not limited to embodiments employing a single pair of transmitting antennae. The implementation of multiple pairs of asymmetrically spaced transmitting antennae is described in more detail in commonly invented, commonly assigned, and co-pending U.S. patent application Ser. No. 12/410,153 (now U.S. Patent Publication 2010/0244842), which is fully incorporated by reference herein. It will be still further appreciated that the invention is not limited to embodiments employing a single pair of collocated receiving antennae. The implementation of multiple receivers and the computation of a virtual receiver response from these receivers is also described in more detail in the '153 patent application.

As stated above, one aspect of the present invention advantageously enables the effect of near-bed anisotropy to be significantly reduced (or substantially eliminated) using first and second asymmetrically positioned transmitters (e.g., as depicted on FIG. 5). It is well known that the $H_{zx}$ cross-component and the $H_{zz}$ component in a homogeneous, anisotropic medium may be expressed mathematically as follows:

$$H_{zx} = \frac{M}{4\pi L^3}\left[\frac{\cos\theta}{\sin\theta}ik_hL(e^{ik_hL}-e^{i\beta k_hL})\right] \quad \text{Equation 7}$$

$$H_{zz} = \frac{M}{4\pi L^3}[2(1-ik_hL)e^{ik_hL}+ik_hL(e^{ik_hL}-e^{i\beta k_hL})] \quad \text{Equation 8}$$

where M represents the transmitter moment, L represents the axial distance between the transmitter and receiver, 0 represents the relative dip angle, and $k_h$ represents the wave number corresponding to the horizontal resistivity such that: $k_h=\sqrt{i\omega\mu\sigma_h}$, where $\omega$ represents the frequency of the transmitted electromagnetic radiation in units of radians, $\mu$ represents the magnetic permeability, and $\sigma_h$ represents the horizontal component of the formation conductivity. The parameter $\beta$ is related to the horizontal and vertical components of the formation conductivity and may be expressed mathematically as follows: $\beta=\sqrt{1+(\sigma_v/\sigma_h-1)\sin^2\theta}$, where $\theta$ and $\sigma_h$ are as defined above and $\sigma_v$ represents the vertical component of the formation conductivity.

Substituting Equations 7 and 8 into Equation 2 yields:

$$\frac{H_{zx}}{H_{zz}} = \frac{\frac{\cos\theta}{\sin\theta}ik_hL(e^{ik_hL}-e^{i\beta k_hL})}{2(1-ik_hL)e^{ik_hL}+ik_hL(e^{ik_hL}-e^{i\beta k_hL})} \quad \text{Equation 9}$$

One aspect of the present invention is the realization that the ratio r (as given in Equations 1, 2, and 9) remains the same when the properties of two measurement systems obey the following constraint:

$$\omega_1\mu_1\sigma_{h1}L_1^2=\omega_2\mu_2\sigma_{h2}L_2^2 \quad \text{Equation 10}$$

Assuming the medium (the subterranean formation) properties to be the same (or nearly the same) for both transmitters, i.e., $\mu_1\sigma_{h1}=\mu_2\sigma_{h2}$, the constraint in Equation 10 simplifies to $f_1L_1^2=f_2L_2^2$. Therefore, for an asymmetric system such as that depicted on FIG. 5, the ratios $H_{zx1}/H_{zz1}$ and $H_{zx2}/H_{zz2}$ are substantially equal when $f_1L_1^2=f_2L_2^2$ (i.e., when $f_1/f_2=L_2^2/L_1^2$).

Figure 6:
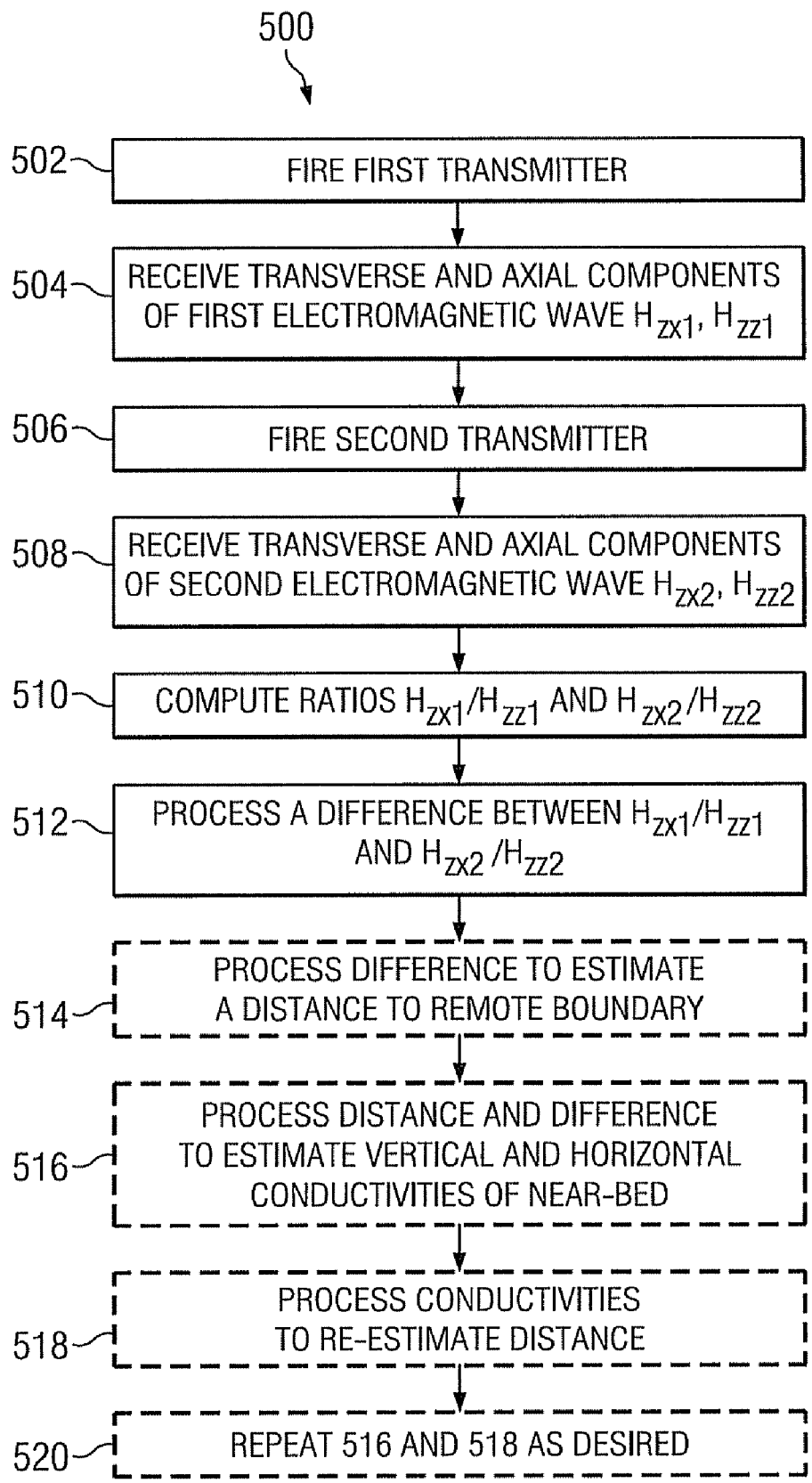
FIG. 6 depicts another exemplary method embodiment in accordance with the present invention in flow chart form.

With continued reference to FIG. 5, and further reference now to FIG. 6, one aspect of the present invention is a method 500 for removing the effect of near-bed anisotropy from directional resistivity measurements. At steps 502 and 506, the first and second transmitting antennae 422 and 424 are fired sequentially at the corresponding first and second frequencies $f_1$ and $f_2$. The invention is not limited by the order of transmitter firing. Either transmitting antenna may be energized first. Corresponding voltage responses are measured at the collocated receiving antennae 432 and 434 at steps 504 and 508. At step 510, the ratios $H_{zx1}/H_{zz1}$ and $H_{zx2}/H_{zz2}$ are computed. The anisotropy effect (the near-bed response) may then be removed (or significantly reduced) at step 512 by processing a difference between the ratios $H_{zx1}/H_{zz1}$ and $H_{zx2}/H_{zz2}$ (e.g., $H_{zx1}/H_{zz1}-H_{zx2}/H_{zz2}$). It will be understood by those of ordinary skill in the art that method 500 may equivalently include computing and processing a difference between the voltage ratios $V_{zx1}/V_{zz1}$ and $V_{zx2}/V_{zx2}$. It will further be appreciated that the method 500 advantageously potentially provides for improved accuracy as compared with the methods disclosed in the '153 patent application in that it does not require computing $L_1^3 \cdot H_{zx1}$ and $L_2^3 \cdot H_{zx2}$.

After processing the difference in step 512 (and thereby removing or significantly reducing the contribution of near-bed anisotropy), the processed ratios may be optionally further processed to estimate the distance to the remote bed (assuming there is a remote bed in sensory range of the directional resistivity measurements) and the conductivity of the remote bed. This may be accomplished, for example, at 514 by assuming an isotropic near-bed and computing conductivities of the near and remote beds and the distance from the resistivity tool to the remote bed using techniques known to those of ordinary skill in the art. At 516, the distance and remote bed conductivity estimated at 514 may be further processed in combination with the ratios to calculate vertical and horizontal conductivities of the near-bed as well as a dip angle of the near-bed. At 518, the vertical and horizontal conductivities as well as the dip angle estimated in 516 may be further processed in combination with the ratios to recalculate the distance to the remote bed and the remote bed conductivity. At 520, method steps 516 and 518 may be repeated iteratively as often as is necessary to converge on a solution for any or all of the formation parameters of interest (e.g., remote bed conductivity, near-bed vertical and horizontal conductivities, near-bed dip angle, and the distance between the measurement tool and the remote bed).

The present invention may further include correlating the above described voltage or magnetic field ratios with a measured azimuth angle so as to construct directional resistivity images. Such images are known in the art to convey the dependence of the electrical measurements on the borehole azimuth angle and the measured depth. Such images may advantageously be constructed via computing a first order harmonic representation of a plurality of measured voltage ratios as disclosed in commonly invented, commonly assigned, co-pending U.S. patent application Ser. No. 12/463,029 (now U.S. Patent Publication 2010/0286966).

It will be understood that the aspects and features of the present invention may be embodied as logic that may be processed by, for example, a computer, a microprocessor, hardware, firmware, programmable circuitry, or any other processing device known in the art. Similarly the logic may be embodied on software suitable to be executed by a processor, as is also well known in the art. The invention is not limited in this regard. The software, firmware, and/or processing device may be included, for example, on a downhole assembly in the form of a circuit board, on board a sensor sub, or MWD/LWD sub. Electronic information such as logic, software, or measured or processed data may be stored in memory (volatile or non-volatile), or on conventional electronic data storage devices such as are well known in the art.

Although the present invention and its advantages have been described in detail, it should be understood that various changes, substitutions and alternations can be made herein without departing from the spirit and scope of the invention as defined by the appended claims.

I claim:

1. A method for making a directional resistivity measurement in a subterranean borehole, the method comprising:
   (a) rotating a directional resistivity tool in a borehole, the directional resistivity tool including (i) at least first and second transmitting antennae and (ii) at least one receiving antenna configured to receive an a substantially pure z-mode component of an electromagnetic wave, the receiving antenna being longitudinally spaced from the transmitting antennae, the first and second transmitting antennae configured to transmit corresponding substantially pure z-mode and x-mode electromagnetic waves;
   (b) causing the first transmitting antenna to transmit a first electromagnetic wave;
   (c) causing the receiving antenna to receive a substantially pure z-mode component of the first electromagnetic wave;
   (d) causing the second transmitting antenna to transmit a second electromagnetic wave;
   (e) causing the receiving antenna to receive a substantially pure z-mode component of the second electromagnetic wave; and
   (f) computing a ratio of the components received in (c) and (e).

2. The method of claim 1 wherein the first and second transmitting antennae are collocated.

3. The method of claim 1, wherein the first and second transmitting antennae comprise first and second collocated non-planar transmitting antennae.

4. The method of claim 3, wherein the ratio is computed in (f) according to the following mathematical equation:

$$r = \frac{V_{xz}}{V_{zz}};$$

wherein r represents the ratio, $V_{zz}$ represents the z-mode component received in (c), and $V_{xz}$ represents the z-mode component received in (e).

5. The method of claim 3, wherein:
   the tool further comprises a third transmitting antenna configured to transmit a substantially pure y-mode electromagnetic wave; and
   the method further comprises:
   (g) causing the third transmitting antenna to transmit a third electromagnetic wave;
   (h) causing the receiving antenna to receive a substantially pure z-mode component of the third electromagnetic wave; and
   (i) computing a ratio of the components received in (c) and (h).

6. A method for making directional resistivity measurements in a subterranean borehole, the method comprising:
   (a) rotating a directional resistivity tool in the borehole, the directional resistivity tool including first and second collocated receiving antennae deployed axially between first and second transmitting antennae, the first and second receiving antennae configured to receive corresponding substantially pure z-mode and x-mode components of an electromagnetic wave, the first and second transmitting antennae being asymmetrically spaced about the receiving antennae such that $L_1 \neq L_2$, wherein $L_1$ and $L_2$ represent axial distances between the receiving antennae and the corresponding first and second transmitting antennae;
   (b) causing the first transmitting antenna to transmit a first electromagnetic wave at a corresponding first frequency $f_1$;
   (c) causing the first and second receiving antennae to receive corresponding substantially pure z-mode and x-mode components of the first electromagnetic wave;
   (d) causing the second transmitting antenna to transmit a second electromagnetic wave at a corresponding second frequency $f_2$ such that $f_1/f_2=L_2^2/L_1^2$;
   (e) causing the first and second receiving antennae to receive corresponding substantially pure z-mode and x-mode components of the second electromagnetic wave; and
   (f) computing a first ratio of the z-mode and x-mode components received in (c) and a second ratio of the z-mode and x-mode components received in (e).

7. The method of claim 6, further comprising:
   (g) processing a difference between the first and second ratios computed in (f).

8. The method of claim 7, wherein the difference between the first and second ratios is computed according to the equation:

$$d = V_{zx1}/V_{zz1} - V_{zx2}/V_{zz2};$$

wherein d represents the difference, $V_{zx1}/V_{zz1}$ represents first ratio, and $V_{zx2}/V_{zz2}$ represents the second ratio.

9. The method of claim 7, further comprising:
   (h) processing the difference obtained in (g) to estimate a distance between the resistivity tool and a remote boundary layer.

10. The method of claim 9, further comprising:
    (i) processing the distance estimate in (h) and the difference obtained in (g) to estimate vertical and horizontal conductivities of a near bed.

11. A directional resistivity tool comprising:
    a logging while drilling tool body;
    at least first and second transmitting antennae deployed on the tool body and configured to transmit corresponding substantially pure z-mode and x-mode electromagnetic waves;

at least one receiving antennae longitudinally spaced from the transmitting antennae, the receiving antenna configured to receive a substantially pure z-mode component of an electromagnetic wave; and a controller configured to (i) cause the transmitting antenna to sequentially transmit corresponding first and second z-mode and x-mode electromagnetic waves, (ii) cause the receiving antenna to receive substantially pure z-mode components of each of the first and second electromagnetic waves transmitted in (i), and (iii) compute a ratio of the z-mode components received in (ii).

12. The directional resistivity tool of claim 11, wherein the first and second transmitting antennae are collocated.

13. The directional resistivity tool of claim 11, wherein at least one of the first and second transmitting antennae comprises a non-planar antenna.

14. The directional resistivity tool of claim 11, wherein the first and second transmitting antennae comprise first and second collocated non-planar transmitting antennae.

* * * * *